United States Patent Office 3,442,974
Patented May 6, 1969

3,442,974
THERMOSETTABLE EPOXIDES CONTAINING ISO-CYANATE BLOCKED WITH PHENOL-FORMAL-DEHYDE NOVOLACS
Bart J. Bremmer, Midland, Mich., assignor to The Dow Chemical Company, Midland, Mich., a corporation of Delaware
No Drawing. Filed May 17, 1965, Ser. No. 456,505
Int. Cl. C08g 23/08, 30/14
U.S. Cl. 260—831          7 Claims

ABSTRACT OF THE DISCLOSURE

This application is directed to a shelf stable thermosettable epoxy resin mixture comprising a polyepoxide containing more than one 1,2-epoxy group per molecule in admixture with a polyisocyanate having all of the isocyanate groups blocked by reaction with an excess of a phenolic hydroxyl compound and wherein said mixture contains from 0.75 to 0.95 phenolic hydroxyl equivalent per epoxide equivalent.

---

This invention relates to an epoxy resin containing a polyisocyanate as a cross-linking agent. More precisely, the invention concerns a thermosettable resin mixture which is insensitive to moisture and remains thermoplastic until it is heated to a temperature of about 50° C. or higher.

It is well known that epoxy resins can be cured by cross-linking with a diisocyanate or diisothiocyanate. U.S. Patent No. 2,594,979 teaches such a resin system which cures at room temperature over a period of about 15 hours. Thus, these resin-forming mixtures have a short pot life owing to their high reactivity. To delay the reaction of the isocyanate with reactive hydrogen atoms in the resin mixture, the isocyanate groups have been blocked by reaction with a compound to produce an adduct which decomposes at an elevated temperature and releases the isocyanate. In some instances, the blocking agent is a compound which, like the diisocyanate, cross-links the linear resin. The additional cross-linking afforded by the blocking agent might be undesirable for some purposes owing to the greater hardness and brittleness of the cured resin. Canadian Patent No. 692,787 teaches an adduct of a diisocyanate and an aryl alkyl amine as a curing agent of this type for epoxy resins. In other instances the blocking agent may be a diluent in that it does not become chemically combined in the resin system. In those instances, the blocking agent released by the diisocyanate when the resin is cured must be removed by vaporization or other means to avoid dilution of the resin.

I have discovered an epoxy resin system containing a blocked diisocyanate which produces a resin having a long shelf life and which may be cured by baking at an elevated temperature. Additionally, the blocking agent largely reacts with the epoxy resin in a manner which increases the length of the polymer chain so that cross-linking is accomplished primarily by the diisocyanate. Thus, resins prepared according to my invention can be stored at room temperature for long periods of time before they are used. The thermoset product obtained by baking at an elevated temperature has improved properties at high temperature, higher strength, etc. than other epoxy resins having a long shelf life.

The resin according to my invention comprises a polyepoxide mixed with the adduct of a diisocyanate and a phenolic hydroxyl compound. The mixture preferably contains a catalytic amount of a tertiary amine and a small quantity of a solvent such as a low molecular weight ketone.

Toluene diisocyanate or other isocyanate will react with a phenolic compound such as 2,2-bis(4-hydroxyphenyl) propane, i.e. bisphenol A, to produce a urethane linkage. The reaction between an isocyanate group and a phenolic hydroxy group is illustrated in the following equation:

$$R_1-N=C=O + HO-R_2 \longrightarrow R_1-NH-\overset{O}{\underset{\|}{C}}-O-R_2 \quad (I)$$

When an exces of the phenolic compound is reacted with the diisocyanate, all of the isocyanate groups will be blocked as shown in Equation I. Upon heating to a higher temperature, the diisocyanate is unblocked, yielding the original mixture of the phenolic compound and diisocyanate according to Equation II.

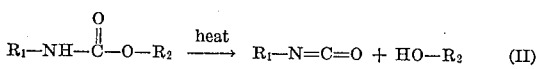
$$R_1-NH-\overset{O}{\underset{\|}{C}}-O-R_2 \xrightarrow{heat} R_1-N=C=O + HO-R_2 \quad (II)$$

A mixture containing an epoxy resin such as the diglycidyl ether of bisphenol A and a diisocyanate blocked with a phenolic hydroxyl compound is stable over long periods of time at room temperature or slightly higher. Upon heating the mixture to a temperature where unblocking occurs, the released phenolic hydroxyl groups react with the epoxy groups in the presence of a tertiary amine catalyst, forming an ether linkage and a secondary hydroxyl group as shown in the following equation:

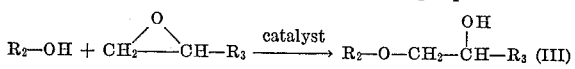
$$R_2-OH + CH_2-CH-R_3 \xrightarrow{catalyst} R_2-O-CH_2-\overset{OH}{\underset{|}{C}H}-R_3 \quad (III)$$

When the phenolic compound contains more than one hydroxyl group as in the cases of bisphenol A and the phenolformaldehyde novolacs, the polyphenol bridges or links together two or more epoxide molecules, thereby increasing the length of the polymer chain. In this manner, a polyhydric phenol used as the blocking agent will have a tendency to produce long chain polymers as each of the hydroxyl groups reacts with an epoxy group. Phenolic compounds having more than two hydroxyl groups such as the novolacs of phenol and formaldehyde produce a branched polymer with the epoxy, the amount of branching generally being in proportion to the fuctionality of the novolac. The diisocyanate reacts readily with the secondary hydroxyl group, forming a cross-link between the otherwise linear chains resulting from the reaction between the epoxide and phenolic hydroxyl groups according to Equation IV.

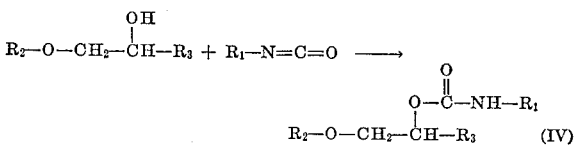
$$R_2-O-CH_2-\overset{OH}{\underset{|}{C}H}-R_3 + R_1-N=C=O \longrightarrow$$
$$R_2-O-CH_2-\underset{|}{\overset{O-\overset{O}{\underset{\|}{C}}-NH-R_1}{C}H}-R_3 \quad (IV)$$

Likewise, each of the additional isocyanate groups in $R_1$ of Equation IV can react with a secondary hydroxyl group in another resin molecule to effect a cross-link.

The method of preparing these resins can be illustrated by the following examples.

EXAMPLE 1

A blocked isocyanate was prepared by charging a reactor with 180 parts by weight of a phenol-formaldehyde novolac having an average of 3.5 hydroxyl groups per molecule and 180 parts of methyl ethyl ketone. 43.5 parts of toluene diisocyanate were added to the reaction mixture over a one hour period while the temperature was maintained between 25 and 35° C. When all of the isocyanate had been added, the temperature was increased to 70° C. and held at that level for two hours. Infrared analysis indicated all of the isocyanate groups has reacted. The solvent ketone was then removed by distillation, leaving 223.5 parts of a yellowish, resinous solid containing 2.9% nitrogen by analysis.

EXAMPLE 2

Following the same procedure as in Example 1, a blocked isocyanate was prepared from a reaction mixture comprising: 331 parts of tribromophenol; 300 parts of methyl ethyl ketone; and 90.7 parts of toluene diisocyanate. At the end of the reaction, only a part of the ketone solvent was removed so that the blocked isocyanate crystallized from the solution. 322 parts of crystals were recovered, the adduct containing 57.6% bromine and 3.6% nitrogen.

The phenol-blocked isocyanates prepared in Examples 1 and 2 were used to cure epoxy resins. The properties of these cured resins were compared with those of resins cured with the phenol alone. The compositions of these samples are presented in the following Examples 3–8. The cure schedule in all cases was 2 hours at 90° C. followed by 3 hours at 165° C. The resin samples contained 0.5 weight percent of benzyldimethylamine as a catalyst. The heat distortion temperatures of the cured samples were determined according to ASTMD–635–56T. Three different epoxy resins were used in these examples. The epoxy resin designated as D.E.R. 331 is a di-glycidyl ether produced from epichlorohydrin and bisphenol A, i.e. 2,2-bis(4-hydroxyphenyl) propane and has an epoxide equivalent weight (E.E.W.) of 186–192. D.E.N. 438 is a polyepoxide produced from epichlorohydrin and a phenol-formaldehyde novolac having an average of 3.5 hydroxyl groups per molecule, the polyepoxide having an E.E.W. of 175–182. D.E.R. 542 is a nuclear brominated diepoxide derived from epichlorohydrin and brominated bisphenol A. The diepoxide contains 44–48 weight percent bromine and has an E.E.W. of 350–400.

EXAMPLE 3

An epoxy resin mixture containing 0.16 equivalent of D.E.R. 542 and 0.28 equivalent of D.E.R. 331 was combined with a quantity of the adduct produced in Example 1 which furnished 0.35 equivalent of phenolic hydroxyl and 0.1 equivalent of toluene diisocyanate. The cured resin had a heat distortion temperature of 136° C.

EXAMPLE 4

A mixture containing 0.286 equivalent of D.E.R. 542 and 0.714 equivalent of D.E.R. 331 was cured with a quantity of novolac similar to that used in preparing the adduct of Example 1. The novolac provided 0.89 equivalent of phenolic hydroxyl groups. When cured, this resin which contained no diisocyanate had a heat distortion temperature of 112° C.

EXAMPLE 5

D.E.N. 438 (0.688 equivalent) was cured with a quantity of the adduct produced in Example 2 which contained 0.35 equivalent of the novolac, 0.2 equivalent of the tribromophenol and 0.2 equivalent of toluene diisocyanate. The heat distortion temperature of the resin was 112° C.

EXAMPLE 6

In this example 0.437 equivalent of D.E.N. 438 was cured with a mixture containing 0.1 equivalent of tribromophenol and 0.25 equivalent of the novolac used in preparing the adduct of Example 2. The heat distortion temperature of the resin was 94° C.

EXAMPLE 7

A mixture of the adducts produced in Examples 1 and 2 was used to cure 0.625 equivalent of D.E.R. 331. The adduct mixture contained 0.2 equivalent of tribromophenol, 0.3 equivalent of novolac and 0.29 equivalent of toluene diisocyanate. The heat distortion temperature of the resin was 107° C.

EXAMPLE 8

A resin similar to that prepared in Example 7 except for the diisocyanate was prepared by curing 0.388 equivalent of D.E.R. 331 with a mixture containing 0.1 equivalent of tribromophenol and 0.21 equivalent of novolac. The resin had a heat distortion temperature of 65° C.

EXAMPLE 9

2.5 equivalents of D.E.R. 511 (a brominated epoxy resin produced from epichlorohydrin and bisphenol A containing 18–20 percent bromine and having an E.E.W. of 445–520) was cured with 1.0 equivalent of toluene diisocyanate blocked with 2.0 equivalents of bisphenol A, in the presence of a small amount of triethylamine as a catalyst. The cure was accomplished by first B-staging glass cloth (1528) having a Volan A finish and impregnated with the resin at 250° F., for 6 minutes then contacting the resin at 345° F., first at 20 lb./sq. in. for 0.25 minute then at 500 lb./sq. in. for 30 minutes. At room temperature the flexural strength of the cured resin was 62,800 lb./sq. in. and the tensile strength was 47,767 lb./sq. in.

EXAMPLE 10

The resin sample prepared here corresponded to that of Example 9 except that diphenyl methane diisocyanate was used in place of the toluene diisocyanate. The cure schedule for the impregnated glass cloth included B-staging at 250° F. for one minute then contacting at 345° F., first at 20 lb./sq. in. for 0.25 minute then at 500 lb./sq. in. for 60 minutes. At room temperature this resin had a flexural strength of 78,700 lb./sq. in. and a tensile strength of 52,367 lbs./sq. in.

EXAMPLE 11

Two equivalents of D.E.R. 661 (a diglycidyl ether produced from epichlorohydrin and bisphenol A having an E.E.W. of 475–575) were cured by reaction with 1.5 equivalents of tetrabromobisphenol A and 0.1 equivalent of toluene diisocyanate blocked with 0.3 equivalent of a novolac of the type used in Example 1, in the presence of 0.1 weight percent of benzyldimethylamine as an accelerator or catalyst. The cure schedule of the resin-impregnated cloth included B-staging at 250° F. for 5.5 minutes then contacting at 345° F., first at 20 lb./sq. in. for one minute then at 500 lb./sq. in. for 60 minutes. At room temperature the cured resin had a flexural strength of 80,433 lb./sq. in. and a tensile strength of 55,100 lb./sq. in. Another sample having a similar composition except that it contained no diisocyanate produced a laminate having comparable properties at room temperature but inferior properties at 300° F.

In all of the foregoing examples it can be seen that the presence of as little as 0.05 equivalent of a polyisocyanate per epoxide equivalent enhances the properties of the cured polyepoxides at elevated temperatures. Additionally, resins containing the blocked isocyanate have substantially unlimited shelf life. Samples of these resin mixtures show no noticeable change after storage for over a year.

In addition to the polyepoxides employed in the above examples, any of the polyepoxides containing more than one oxirane group per molecule can be used in the practice of this invention. The properties of the cured resin will vary to some extent depending on the particular polyepoxide used, however the blocking of the isocyanate groups at room temperature and the reaction of the oxirane groups with the phenolic hydroxy groups at elevated temperatures where the isocyanate becomes unblocked are substantially unaffected by the molecular structure of the non-oxirane portion of the polyepoxide molecule.

Organic polyisocyanates which can be blocked and used according to this invention include toluene diisocyanate, diphenylmethane diisocyanate, 1,3-phenylene diisocyanate, naphthylene diisocyanate, polymethylene polyphenylisocyanate and mixtures thereof.

Phenolic compounds which can be used to block the diisocyanates can be either monohydric or polyhydric phenols. The monohydric phenols terminate the epoxy resin molecules whereas the polyhydric phenols couple resin molecules together, increasing the length of the polymer chain. Illustrative of the phenolic compounds which may be used in the practice of the invention are phenol, cresol, resorcinol, hydroquinone, tribromophenol, 2,2-bis-(4-hydroxyphenyl) propane, bis-(4-hydroxyphenyl) methane, bis-(4-hydroxyphenyl) sulfide, bis-(4-hydroxyphenyl) sulfone, and phenol-formaldehyde novolacs having a functionality from two to about 5, i.e. containing from two to about 5 phenolic hydroxyl groups.

The reaction of the blocking agent with the isocyanate is slow at moderate temperatures of about 75° C. unless a catalyst is added to accelerate the reaction. Tertiary amines such as triethylamine, tripropylamine, pyridine, quinoline, methyl piperidine, benzyldimethylamine, dimethylaniline and the like are suitable accelerators. The presence of the amine in the blocked isocyanate promotes the cure of the epoxy resin when the adduct is broken down at elevated temperature. The phenolic hydroxyl groups react with the oxirane groups more readily, producing secondary hydroxyl groups which then react with the isocyanate groups. In some instances it may be desirable to add more tertiary amine to the resin mixture for the purpose of accelerating the cure.

The diisocyanate curing agent should be blocked with an excess of the phenolic compound. To produce cured epoxy resins which are tough and have good heat and solvent resistance the curing agent should provide from about 0.75 to about 0.95 equivalent of phenolic hydroxyl groups per epoxy equivalent, i.e. per oxirane group. The amount of cross-linking afforded by the diisocyanate also affects the toughness and resistance of the cured resin. For most purposes a satisfactory cure can be obtained with a resin system containing from 0.05 to about 0.7 equivalent of isocyanate groups per epoxy equivalent.

These thermosettable resins can be used to great advantage for many applications. Varnishes comprising the epoxy resin and phenol-blocked diisocyanate dissolved in a vehicle such as methyl ethyl ketone have practically unlimited shelf stability at ordinary room temperatures yet can be cured by baking following application to a substrate. These long shelf life resins are also useful as laminating, casting, potting and encapsulating resins. Resin systems containing a halogen such as bromine on the phenol and/or epoxy resin groups have improved flame retardance.

I claim:
1. A shelf stable thermosettable epoxy resin mixture comprising a polyepoxide containing more than one 1,2-epoxy group per molecule in admixture with a polyisocyanate having all of the isocyanate groups blocked by reaction with an excess of a phenol-formaldehyde novolac having at least two phenolic hydroxyl groups per molecule and wherein said mixture contains from 0.75 to 0.95 phenolic hydroxyl equivalent per epoxide equivalent.

2. A resin mixture according to claim 1 wherein said mixture is dissolved in a volatile solvent.

3. A resin mixture according to claim 1 wherein said polyepoxide is a digylcidyl ether produced by the reaction of epichlorohydrin with bisphenol A.

4. A resin mixture according to claim 1 which contains a catalytic amount of a teritary amine.

5. A resin mixture according to claim 1 wherein at least one of said polyepoxide and said phenolic hydroxyl compound contains nuclear bromine atoms.

6. A resin mixture according to claim 1 wherein said mixture contains from 0.05 to about 0.7 equivalent of isocyanate groups per epoxy equivalent.

7. A thermosettable epoxy resin mixture comprising:
one equivalent of a diepoxide produced by the reaction of epichlorohydrin with bisphenol A; and
the adduct produced by reacting a quantity of toluene diisocyanate which contains from 0.05 to about 0.7 equivalent of isocyanate groups with a phenol-formaldehyde adduct having a hydroxyl functionality of about 3.5 and containing from 0.75 to 0.95 phenolic hydroxyl equivalent in the presence of a catalytic amount of triethylamine.

References Cited

UNITED STATES PATENTS 2,906,717  9/1959  Sekmakas _____ 260—831

FOREIGN PATENTS 763,347  12/1956  Great Britain.

MURRAY TILLMAN, Primary Examiner.

P. LIEBERMAN, Assistant Examiner.

U.S. Cl. X.R.

260—47